United States Patent [19]

McCurdy et al.

[11] Patent Number: 4,835,513
[45] Date of Patent: May 30, 1989

[54] METHOD AND APPARATUS FOR TESTING AN AIRBAG RESTRAINT SYSTEM

[75] Inventors: Roger A. McCurdy, Troy; Dana A. Stonerook, Plymouth, both of Mich.

[73] Assignee: TRW Inc., Lyndhurst, Ohio

[21] Appl. No.: 184,831

[22] Filed: Apr. 22, 1988

[51] Int. Cl.$^4$ .................. B60Q 1/00; B60R 21/32
[52] U.S. Cl. ..................... 340/438; 340/436; 340/650; 340/653; 340/661; 180/271; 180/282; 180/232; 280/735; 361/1; 307/10.1
[58] Field of Search ............ 340/52 R, 52 H, 61, 340/635, 647, 657, 650, 653, 661, 530; 180/271, 282, 232, 274, 278; 288/728, 734, 735; 361/1; 307/10 R; 200/61.45 R

[56] References Cited

U.S. PATENT DOCUMENTS

| | | | |
|---|---|---|---|
| 3,629,816 | 12/1971 | Gillund | 340/61 |
| 3,633,159 | 1/1972 | Dillman et al. | 340/52 H |
| 3,668,627 | 6/1972 | Brainerd | 340/52 H |
| 3,714,627 | 1/1973 | Dillman et al. | 340/52 H |
| 3,745,523 | 7/1973 | Lewis et al. | 340/52 H |
| 3,774,151 | 11/1973 | Lewis et al. | 340/52 H |
| 3,863,208 | 1/1975 | Balban | 340/52 H |
| 4,163,268 | 7/1979 | Spies et al. | 361/1 |
| 4,278,971 | 7/1981 | Yasui et al. | 340/52 H |
| 4,287,431 | 9/1981 | Yasui et al. | 340/52 H |

*Primary Examiner*—Donnie L. Crosland
*Attorney, Agent, or Firm*—Tarolli, Sundheim & Covell

[57] ABSTRACT

A test circuit for an airbag restraint system provides an accurate determination of the operativeness of a storage capacitor and calculates the resistance of inertia switch resistors. The test circuit provides for parallel testing of the storage capacitor and inertia resistors. The capacitor is tested by discharging and charging the capacitor. The values of the inertia switch resistors are determined by switching known resistive values in parallel with the inertia switch resistors. Based on the monitored voltage values during the switching, resistance values are calculated.

15 Claims, 6 Drawing Sheets

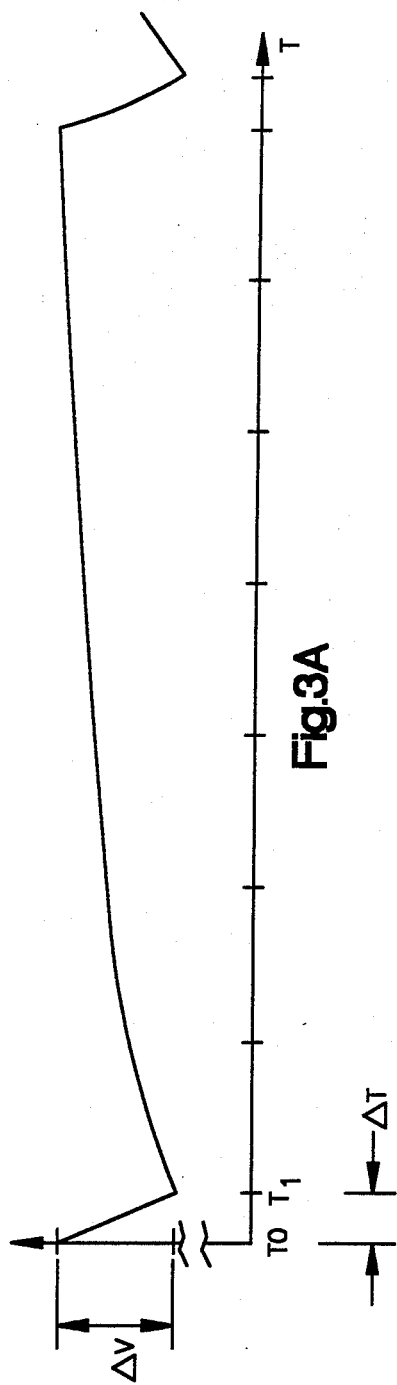
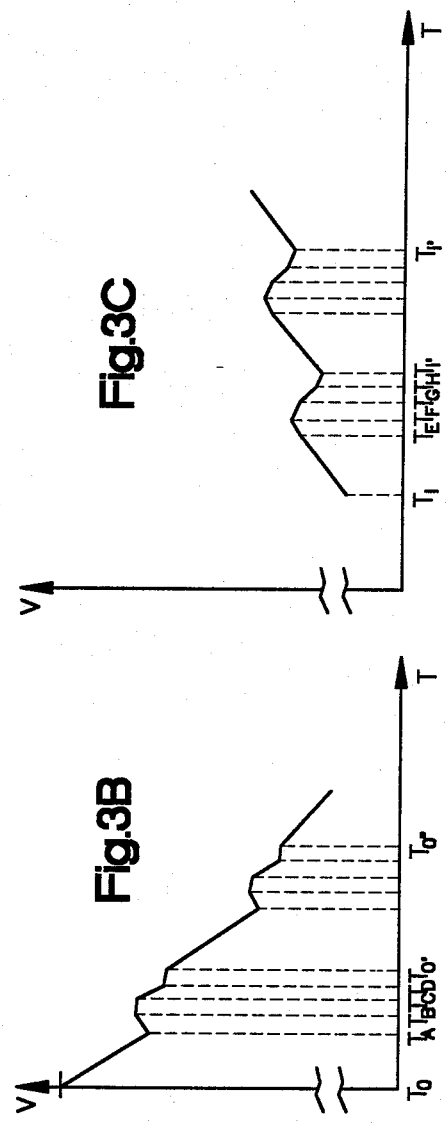
Fig.3A
Fig.3B
Fig.3C

METHOD AND APPARATUS FOR TESTING AN AIRBAG RESTRAINT SYSTEM

TECHNICAL FIELD

The present invention relates to diagnostic testing of an airbag restraint system and is particularly directed to a method and apparatus for testing (i) the operativeness of a storage capacitor and (ii) the impedance values of inertia switch resistors in an airbag restraint system.

BACKGROUND ART

Airbag restraint systems for passenger vehicles are known in the art. Such systems typically include an actuation circuit and a diagnostic circuit. The actuation circuit includes at least one inertia switch connected in series with a detonating device, e.g., a squib, and a source of electrical energy. The diagnostic circuit tests the operativeness of the actuation circuit and controls actuation of an indicator to inform the vehicle operator of a detected system error. Such diagnostic circuits typically monitor voltage values at various test points in the actuation circuit and compares the monitored voltage values against predetermined limits. When a monitored voltage value is outside of its predetermined limits, a system error has occurred.

Airbag restraint systems receive their operating power from the vehicle battery. When vehicle deceleration exceeds a value sufficient to close the inertia switches in the restraint system, e.g., during a vehicle crash, a squib is "fired" and the airbag is inflated. The battery provides the electrical energy to fire a squib. Typical airbag restraint systems include a storage capacitor that functions as either a main power source or as a back-up power source should the actuation circuit become disconnected from the vehicle battery during a crash.

The storage capacitor in such airbag restraint systems must have a sufficient capacitance value to insure that an adequate supply of electrical energy will be available to fire the squib. Some prior art diagnostic circuits monitor the static, steady-state voltage developed across the capacitor. An incorrect capacitance value, however, cannot be detected by simply monitoring the static steady-state voltage developed across the capacitor.

U.S. Pat. No. 3,714,627 discloses a diagnostic circuit for an airbag restraint system that tests the operativeness of a storage capacitor. The voltage developed at a connection terminal of the storage capacitor is compared to the charge voltage developed across a test capacitor during initial energization o the restraint system. If the voltage value at the terminal of the storage capacitor is greater than the charge across the test capacitor during this initial energization period, such occurrence indicates that the storage capacitor is open circuited. An error indication is provided to the vehicle operator upon such occurrence.

Another known diagnostic circuit for an airbag restraint system is shown in FIG. 1. A squib 10 has one terminal connected to electrical ground through an 0.1 Ohm resistor 12. The other terminal of the squib 10 is connected to capacitors 14, 16. Capacitor 14 is connected to a source of electrical energy V(up) through a diode 18 and a current limiting resistor 20. Capacitor 16 is connected to the source of electrical energy V(up) through a diode 18 and a current limiting resistor 22. The capacitors 14, 16 charge through the squib 10. A voltage is developed across each capacitor 14, 16 substantially equal to V(up). The current limiting resistors 20, 22 prevent the squib 10 from "firing" during the charging of the capacitors 14, 16.

The capacitors 14, 16 are connected to one terminal of an inertia switch 24 through diodes 26, 28, respectively. The other terminal of inertia switch 24 is connected to electrical ground. A resistor 29 is connected in parallel with the inertia switch 24. When the inertia switch 24 closes, the capacitors 14, 16 discharge thereby pulling current through the squib 10 of sufficient magnitude and duration to "fire" the squib.

The capacitors 14, 16 are further connected to field-effect-transistors ("FETs") 30, 32 through resistors 34, 36, respectively. Each FET 30, 32 is controllably connected to a microcomputer 38. The junction of resistor 20 and capacitor 14 is connected to a voltage dividing network 40 including resistors 42, 44 connected in series to electrical ground. The junction of resistor 22 and capacitor 16 is connected to a voltage dividing network 46 including resistors 48, 50 connected in series to electrical ground.

The junction of resistors 42, 44 is connected to an analog-to-digital ("A/D") converter 52. The junction of resistors 48, 50 is connected to the A/D converter 52. The A/D converter is operatively connected to the microcomputer 38. The microcomputer 38 is connected to an indicator 54.

The circuit shown in FIG. 1 tests the operativeness of capacitors 14, 16, serially, i.e., separately. The microcomputer 38 partially discharges one of the capacitors being tested. The microcomputer monitors the voltage across the capacitor being tested through its associated resistor network 40, 46 and its associated connection with the A/D converter 52. If the monitored voltage across the capacitor being tested, which is now partially discharged, is not greater than a predetermined limit, e.g., as would occur when the capacitor is open circuited or is not a proper value, the indicator 54 is energized to warn the vehicle operator of the detected error.

The capacitor test in the system shown in FIG. 1 requires a separate switching FET for each capacitor and a separate voltage dividing network connected to the A/D converter for each capacitor. Also, each capacitor test is time consuming. Because each airbag restraint system must be fully tested during the manufacturing process, such a long period of time needed to complete a test sequence is not desirable. It is, therefore, desirable to decrease the time needed for completion of a test sequence to decrease manufacturing time of the system.

Another concern with airbag diagnostic test circuits is an ability to monitor the operativeness of the system's inertia switches. To accomplish this goal, each inertia switch in known airbag restraint systems includes an associated resistor connected in parallel therewith. Each inertia switch resistor is connected in series with other inertia switch resistors of the system and with the squib. The inertia switch resistors and the squib form a voltage dividing network. A monitoring circuit monitors the voltage at connection terminals of the inertia switches. Based upon the monitored voltage values, the monitoring circuit determines if an inertia switch is electrically short circuited or electrically open circuited. The value of inertia switch resistors must be sufficient to limit the steady state current flow through the squib to a value well below that required to "fire"

the squib. It is, therefore, desirable to be able to accurately measure the impedance of each inertia switch resistor to determine if its value is within predetermined limits.

SUMMARY OF THE INVENTION

The present invention provides a new and improved method and apparatus for testing an airbag restraint system. The invention provides an accurate determination of the operativeness of a storage capacitor in an airbag restraint system of the type having first and second inertia switches, one connected to each side of a squib. The invention also provides an accurate determination of the value of parallel connected inertia switch resistors. The invention further provides a method and apparatus for accomplishing parallel tests in an airbag restraint system so as to reduce the time needed to run a complete test sequence as compared to known systems.

In accordance with the present invention, an apparatus is provided for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a first voltage value so that if the capacitor's capacitance value is greater than a predetermined value, a sufficient electrical potential would be available to fire the squib from the capacitor's stored electrical energy when the first and second inertia switches close. The apparatus in accordance with the invention comprises means for partially discharging the capacitor for a predetermined time period and means for monitoring the voltage value of the charge remaining across the capacitor after the predetermined time period, the monitored voltage value being a second voltage value. The apparatus further comprises means for comparing the difference between the first voltage value and the second voltage value against a predetermined limit. Means are provided for providing a failure indication to the vehicle operator if the comparing means determines that the voltage value difference is greater than the predetermined limit.

In accordance with another aspect of the present invention, an apparatus is provided for testing an airbag restraint system of the type including a squib, a first inertia switch connected to one terminal of the squib and to a source of electrical energy, a second inertia switch connected t the other terminal of the squib and to electrical ground, each of the inertia switches including an associated resistor connected in parallel across its associated switch. The apparatus comprises a first switching network connected in parallel with the first inertia switch, the first switching network including a first actuatable solid state switch connected in series with a first test resistor having a known resistance value for, when actuated, connecting the first test resistor in parallel with the associated resistor for the first inertia switch. A second switching network is connected in parallel with the second inertia switch, the second switching network including a second actuatable solid state switch connected in series with a second test resistor having a known resistance value for, when actuated, connecting the second test resistor in parallel with the associated resistor for the second inertia switch. Means are provided for controlling the first and second solid state switches so as to (i) in a first condition have both solid state switches OFF, and (ii) in a second condition have one solid state switch ON and one OFF. Means are provided for monitoring the voltage value of the source of electrical energy and for monitoring the voltage values at a junction between the squib and one of the inertia switches when one of the solid state switching devices are in the first and second conditions. The apparatus further includes means for calculating the resistance values of the inertia switch resistors from the measured voltage values.

In accordance with still yet another aspect of the present invention, an apparatus for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a first voltage value so that if the capacitor's capacitance value is greater than a predetermined value, a sufficient electrical potential would be available to fire the squib from the capacitor's stored electrical energy when the first and second inertia switches close, each of the inertia switches including an associated resistor connected in parallel thereacross. The apparatus comprises a first switching network connected in parallel with the first inertia switch, the first switching network including a first actuatable solid state switch connected in series with a first test resistor having a known resistance value for, when actuated, connecting the first test resistor in parallel with the associated resistor for the first inertia switch. A second switching network is connected in parallel with the second inertia switch, the second switching network including a second actuatable solid state switch connected in series with a second test resistor having a known resistance value for, when actuated, connecting the second test resistor in parallel with the associated resistor for the second inertia switch. Means are provided for controlling the first and second solid state switches so after a first predetermined time period having the switches (i) in a first condition have both solid state switches OFF, (ii) in a second condition have the first solid state switch ON and the second solid stat switching device OFF, (iii) in a third condition have the first solid state switch ON and the second solid state switch ON, and (iv) in a fourth condition have the first solid state switch OFF and the second solid state switch ON. Means are provided for monitoring the voltage value of the source of electrical energy and for monitoring the voltage values at a junction between the squib and one of the inertia switches when the solid state switching devices are in each of the conditions. The apparatus further includes means for calculating the resistance values of the inertia switch resistors from the measured voltage values. Means are provided for partially discharging the capacitor during the first predetermined time period. The apparatus further includes means for monitoring the voltage value of the charge remaining across the capacitor after the first predetermined time period, the monitored voltage value being a second voltage value, means for comparing the difference between the first voltage value and the second voltage value against a predetermined limit, and means for providing a failure indication to the vehicle operator if the comparing means determines that voltage value difference is greater than the predetermined limit.

In accordance with the present invention, a method is provided for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a first voltage value so that if the capacitor's capacitance value is greater than a predetermined value, a sufficient electrical potential would be available to fire the squib from the capacitor's stored electrical energy when the first and second inertia switch close. The method in accordance with the invention includes the steps of partially discharging the capacitor for a predetermined time period, monitoring the voltage value of the charge remaining across the capacitor after the predetermined time period, the monitored voltage value being a second voltage value, comparing the difference between the first voltage value and the second voltage value against a predetermined limit, providing a failure indication to the vehicle operator if the step of comparing determines that the voltage value difference is greater than the predetermined limit.

In accordance with another aspect of the present invention, a method is provided for testing an airbag restraint system of the type including a squib, a first inertia switch connected to one terminal of the squib and to a source of electrical energy, a second inertia switch connected to the other terminal of the squib and to electrical ground, each of the inertia switches including an associated resistor connected in parallel across its associated switch. The method comprises the steps of switching a first switching network connected in parallel with the first inertia switch, the first switching network including a first actuatable solid state switch connected in series with a first test resistor having a known resistance value for, when actuated, connecting the first test resistor in parallel with the associated resistor for the first inertia switch, switching a second switching network in parallel with the second inertia switch, the second switching network including a second actuatable solid state switch connected in series with a second test resistor having a known resistance value for, when actuated, connecting the second test resistor in parallel with the associated resistor for the second inertia switch, controlling the first and second solid state switches so as to (i) in a first condition have both solid state switches OFF, and (ii) in a second condition have one solid state switch ON and one OFF, monitoring the voltage value of the source of electrical energy, monitoring the voltage values at a junction between the squib and one of the inertia switches when one of the solid state switching device are in the first and second conditions, calculating the resistance values of the inertia switch resistors from the measured voltage values.

In accordance with still yet another aspect of the present invention, a method is provided for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a first voltage value so that if the capacitor's capacitance value is greater than a predetermined value, a sufficient electrical potential would be available to fire the squib from the capacitor's stored electrical energy when the first and second inertia switches close, each of the inertia switches including an associated resistor connected in parallel across its associated switch. The method comprises the steps of switching a first switching network connected in parallel with the first inertia switch, the first switching network including a first actuatable solid state switch connected in series with a first test resistor having a known resistance value for, when actuated, connecting the first test resistor in parallel with the associated resistor for the first inertia switch, switching a second switching network connected in parallel with the second inertia switch, the second switching network including a second actuatable solid state switch connected in series with a second test resistor having a known resistance value for, when actuated, connecting the second test resistor in parallel with the associated resistor for the second inertia switch, controlling the first and second solid state switches so that after a first predetermined time period the switches have been (i) in a first condition with both solid state switches OFF, (ii) in a second condition with the first solid state switch ON and the second solid state switching device OFF, (iii) in a third condition with a first solid state switch ON and the second solid state switch ON, and (iv) in a fourth condition have the first solid state switch OFF and the second solid state switch ON, monitoring the voltage value of the source of electrical energy, monitoring the voltage values at a junction between the squib and one of the inertia switches when the solid state switching devices are in each of the conditions, calculating the resistance values of the inertia switch resistors from the measured voltage values, partially discharging the capacitor during the first predetermined time period, monitoring the voltage value of the charge remaining across the capacitor after the first predetermined time period, the monitored voltage value being a second voltage value, comparing the difference between the first voltage value and the second voltage value against a predetermined limit, providing a failure indication to the vehicle operator if the step of comparing determines that the voltage value difference is greater than the predetermined limit.

BRIEF DESCRIPTION OF THE DRAWINGS

Further features of the present invention will become apparent to those skilled in the art to which the present invention relates from a reading of the following specification with reference to the accompanying drawings, in which:

FIGS. 3A, 3B, and 3C are graphical representations of waveforms present in the apparatus of FIG. 2;

DESCRIPTION OF THE PREFERRED EMBODIMENT

Figure 1:
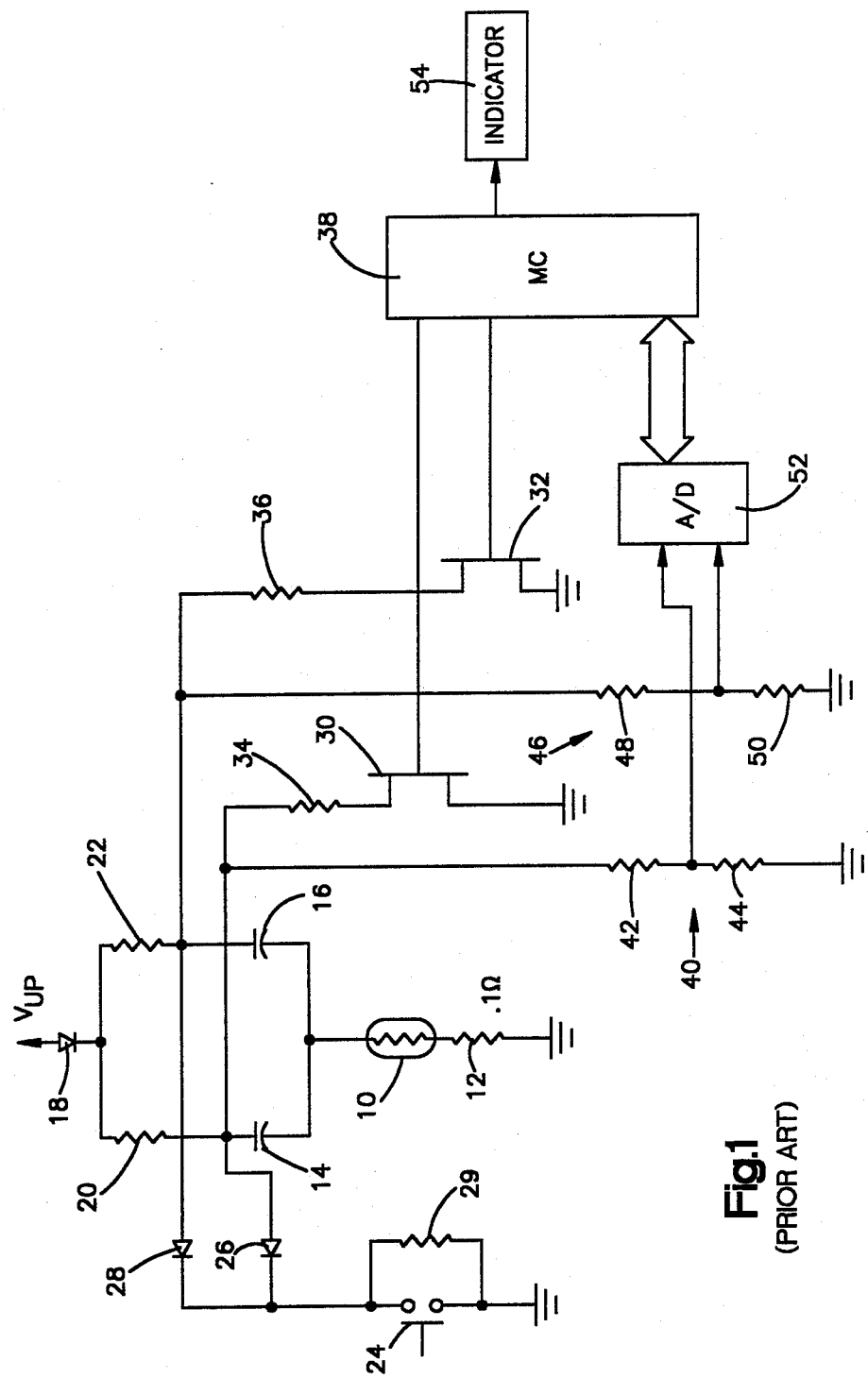
FIG. 1 is a schematic illustration of a portion of a prior art airbag restraint system that includes a test of a storage capacitor's operativeness.
Figure 2:
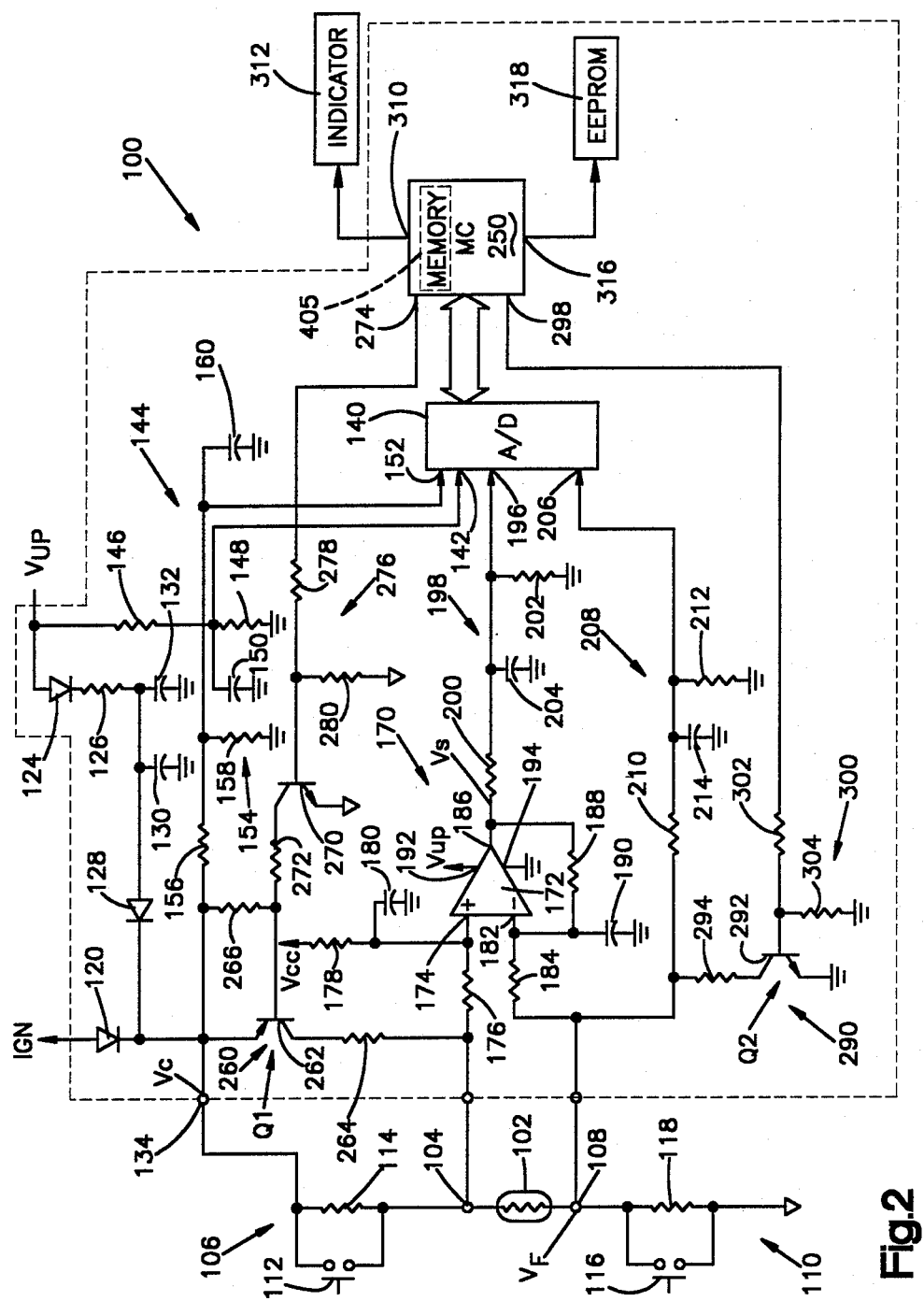
FIG. 2 is a schematic illustration of an apparatus for testing an airbag restraint system in accordance with the present invention.

Referring to FIG. 2, a circuit 100 in accordance with the present invention for use in an airbag restraint system is shown. The circuit 100 includes a squib 102 having a first terminal 104 connected to a first inertia switch assembly 106. The squib 102 includes a second terminal 108 connected to a second inertia switch assembly 110.

The inertia switch assembly 106 includes a normally open inertia switch 112 and a parallel connected resistor 114. The assembly 106 is referred to as the safing sensor. The inertia switch assembly 110 includes a normally open inertia switch 116 and a parallel connected resistor 118. The assembly 110 is referred to as the front sensor. Typically, the safing sensor is located on the interior compartment of the vehicle and the front sensor is located at a remote location near the front of the vehicle.

The front sensor 110 has its second terminal connected to electrical ground. The second terminal 134 of the safing sensor 106 is connected to the vehicle battery through the vehicle's ignition switch and a diode 120. The second terminal 134 of the safing sensor is also connected to the output of a voltage up converter 122 through the series connection of a diode 124, resistor 126, and diode 128.

The value of the output voltage from Vup 122 is substantially greater than the value of the battery voltage received through the ignition switch. The Vup voltage is used to charge capacitors 130, 132 connected in parallel between the junction of resistor 126 and diode 128 and electrical ground. It will be appreciated that the voltage charge on the capacitors 130, 132 is equal to the value of the Vup voltage minus the voltage drop across diode 124 and resistor 126. A voltage present at terminal 134, which is the cathode side of diode 128, is equal to the voltage charge on capacitors 130, 132 minus the value of the voltage drop across the diode 128. The voltage present at terminal 134 is referred to as $V_C$. $V_C$ is substantially greater than the value of the battery voltage so that the diode 120 is reversed biased.

The values of resistors 114 and 118 are sufficient to maintain a steady-state current flow through the squib 102 which is substantially less than that necessary to fire the squib. The resistors 114, 118 form a voltage dividing network. A voltage value is present at terminals 104, 108 which is a ratiometric division of the voltage $V_C$. Typically, the resistance value of the squib 102 is approximately 2 ohms and the values of resistors 114, 118 are typically 5 kohms. Therefore, a voltage will be present at terminals 104, 108 equal to approximately ½ the voltage $V_C$.

An analog-to-digital ("A/D") 140 is used to monitor the voltage values at various test points within the circuit 100. A first input 142 of A/D converter 140 is connected to the output of the voltage up converter 122 through a resistor divider network 144 which includes resistor 146, 148 connected between the output of the voltage up converter 122 and electrical ground. A filter capacitor 150 is connected between the junction is resistors 146, 148 and electrical ground. A second input 152 of A/D converter 140 is connected to the voltage $V_C$ at terminal 134 through a resistor dividing network 154 which includes resistors 156, 158 connected in series between the terminal 134 and electrical ground. A filter capacitor 160 is electrically connected between the junction of resistors 156, 158 and electrical ground.

A differential amplifier circuit 170 is used to monitor the voltage developed across the squib 102. The differential amplifier circuit 170 includes an operational amplifier 172 having its noninverting input 174 connected to the terminal 104 through a resistor 176. The noninverting input 174 is connected to a DC electrical energy source, designated $V_{cc}$ through a resistor 178. Voltage $V_{cc}$ is used to bias the noninverting input 174. Noninverting input 174 is further connected to a filter capacitor 180. The second terminal of capacitor 180 is connected to electrical ground.

The inverting input 182 of the operational amplifier 172 is connected to terminal 108 through a resistor 184. The operational amplifier 172 includes an output 186 which is electrically connected to the inverting input 182 through a resistor 188. The inverting input 182 is further connected to a filter capacitor 190. The second terminal of the filter capacitor 190 is connected to electrical ground. The power supply connection terminals 192, 194 of the operational amplifier 172 are connected to the output of the voltage up converter Vup and electrical ground, respectively.

The output 186 of the operational amplifier 172 is connected to an input terminal 196 of the A/D converter 140 through a resistor dividing network 198. The resistor dividing network 198 includes resistors 200, 202 connected in series between the output 186 of the operational amplifier 172 and electrical ground. A filter capacitor 204 is connected between the junction of resistors 200 and 202 and electrical ground. The detailed operation of the differential amplifier circuit 170 is fully described in pending U.S. patent application Ser. No. 134,953, filed Dec. 18, 1987 and assigned to the assignee of the present application, the disclosure of which is hereby fully incorporated herein by reference.

An input terminal 206 of A/D converter 140 is connected to terminal 108 through a resistor dividing network 208 which includes resistors 210, 212 connected in series between the junction 108 and electrical ground. A filter capacitor 214 is electrically connected between the junction of resistors 210, 212 and electrical ground. The voltage value present at the terminal 108 is referred to as $V_F$. The output 186 of the operational amplifier 172 is referred to as $V_S$.

The A/D converter 140 is operatively connected to a microcomputer 250. The connection with and cooperation between an A/D converter and a microcomputer are well known in the art and therefore will not be described in detail herein. Briefly, the microcomputer addresses an input of the A/D converter. The A/D converter serially outputs a binary number to the microcomputer wherein the number is indicative of the analog voltage present at the address input.

A first switching circuit 260 is electrically connected in parallel with the safing sensor 106. The switching circuit 260 includes a PNP transistor 262 having its emitter connected to the terminal 134. The collector of transistor 262 is connected to terminal 104 through a resistor 264. The base of transistor 262 is connected to the terminal 134 through a resistor 266. The base of transistor 262 is further connected to an NPN transistor 270 through a resistor 272. The emitter of transistor 270 is connected to electrical ground. The base of transistor 270 is electrically connected to an output 274 of microcomputer 250 through a resistor dividing network 276. The resistor dividing network 276 includes resistors 278, 280 connected in series between the output 274 and electrical ground. The base of transistor 270 is connected to the junction of resistors 278, 280.

A second switching circuit 290 is connected in parallel with the front sensor 110. The second switching circuit 290 includes an NPN transistor 292 having its collector connected to the terminal 108 through a resistor 294. The emitter of transistor 292 is connected to electrical ground. The base of transistor 292 is connected to an output 298 of microcomputer 250 through a resistor dividing network 300. The resistor dividing network 300 includes resistors 302, 304 connected in series between the output 298 of microcomputer 250 and electrical ground. The base of transistor 292 is connected to the junction of resistors 302, 304.

The transistors 262, 292 are respectively referred to as Q1, Q2. The microcomputer 250 controls actuation of the transistors Q1, Q2 so as to place resistors 264, 294 in parallel with resistors 114, 118, respectively.

The microcomputer 250 further includes an output 310 connected to an indicator 312 located within the vehicle compartment and clearly visible to the vehicle operator. The indicator 312 is used to provide an indication to the vehicle operator of a detected error within the circuit 100. The microcomputer 250 further includes an output 316 electrically connected to a nonvolatile memory 318, such as an electrically erasable, programmable read only memory ("EEPROM"). The EEPROM is used to record failure information for later analysis by service technicians.

The present invention provides an accurate measurement of the impedance value of each of the inertia switch resistors 114, 118, and test the operativeness of capacitors 130, 132 to insure that the capacitors are properly connected and are of a proper capacitance value. The circuit 100 performs these two tests in parallel, i.e., the two tests are performed simultaneously.

Referring to FIGS. 3A, 3B, 3C, 4A, 4B and 5, the operation of the present invention will be appreciated. Referring first to FIG. 4, in step 400, the system is initially powered up upon the vehicle operator starting the vehicle. The microcomputer 250 delays any further operation of the circuit 100 for an amount of time X1. The time delay X1 is sufficient to insure that the capacitors 130, 132 are fully charged. This delay occurs in step 402. In step 404, the microcomputer measures the value of the voltage $V_C$ present at terminal 134 and measures the value of the voltage Vup. Both measured values are stored in the microcomputer's internal memory 405. To test the capacitance value of capacitors 130, 132, the capacitors are partially discharged, i.e., permitted to discharge for a predetermined amount of time. To accomplish this partial discharge, the microcomputer sets a discharge flag in step 406 and turns ON both transistors Q1 and Q2 in step 408. When transistors Q1 and Q2 are ON, resistor 264 is in parallel with resistor 114 and resistor 294 is in parallel with resistor 118. This parallel resistor combination results in a drop in the value of voltage $V_C$ present at terminal 134.

Referring to FIG. 3A, if the transistors Q1 and Q2 are turned ON at time $T_0$ and are turned OFF at time $T_1$, the voltage $V_C$ will drop by an amount equal to $\Delta V$. If at time $T_1$, the transistors Q1 and Q2 are both turned OFF, the capacitors 130, 132 begin to charge up to the value which is Vup minus the voltage drop across diode 124 and resistor 126. If the capacitance values are greater than a predetermined minimum, the voltage drop $\Delta V$ will be less than a predetermined maximum value. At time $T_1$, the microcomputer can monitor the voltage at $V_C$ and compare that voltage against a predetermined limit. If the voltage at time $T_1$ is less than the predetermined limit, then such is an indication that the capacitance value of capacitors 130, 132 are less than a predetermined minimum. The value of the expected voltage drop $\Delta V$ is functionally related to the value of the voltage Vup.

Assume for the purposes of discussion that the value of the voltage Vup is equal to 26.3 volts DC. The amount of expected voltage drop $\Delta V$ when the transistors Q1 and Q2 are turned ON for predetermined amount of time can be found by the following expression:

$$\Delta V(adj) = \Delta V + (K \cdot (Vup - 26.3)) \quad (1)$$

where
$\Delta V(Adj)$ is the adjusted value of the expected voltage drop, and K is a constant related to the gain of term $(Vup - 26.3)$.

Assume that the expected voltage drop with Q1 and Q2 ON over a 300 millisecond time period between $T_0$ and $T_1$ is 2.5 volts. If the measured voltage Vup is equal to 26.3, then the adjusted voltage $\Delta V$ will be equal to the expected voltage $\Delta V$ which will be 2.5 volts DC. If the voltage Vup is greater than the expected 26.3 volt value, then the adjusted $\Delta V$ will be greater than the expected $\Delta V$ of 2.5 volts. On the other hand, if the voltage Vup is less than the expected voltage value of 26.3 volts, then the adjusted voltage $\Delta V$ will be less than the expected voltage drop of 2.5 volts.

The microcomputer 250 determines whether the difference between the voltage $V_C$ prior to discharge and the $V_C$ after the discharge period is greater than the adjusted $\Delta V$. Assume that the voltage value present at VC when capacitors 130, 132 are fully charged is equal to 25 volts DC. At the end of the discharge period $T_1$, the microcomputer 250 through the A/D converter measures the $V_C$ then present across the capacitors. If the difference between the two voltage measurements is greater than $\Delta V$ adjusted, the indicator 312 will be actuated.

The capacitors 130, 132 must be of sufficient capacitance value to insure that a sufficient amount of electrical energy will be available to fire the squib 102. The electrical energy supplied by the capacitors must be available for a predetermined amount of time after the battery's charging source, Vup, becomes disconnected from the vehicle's battery. Therefore, the capacitance value of capacitors 130, 132 is substantial. The discharge/charge cycle depicted in FIG. 3A typically takes seven seconds to complete. Applicants have found that it is possible to simultaneously test other portions of the control circuit simultaneous with the testing of the capacitors 130, 132.

Referring again to FIGS. 4A and 4B, the microcomputer delays an amount of time X2 in step 410 after the transistors Q1, Q2 are both turned ON. Referring to FIG. 3B, the delay time X2 is depicted as the time between $T_0$ and $T_A$. In step 412, the microcomputer begins to sequence Q1 and Q2 through various ON and OFF states. The voltage values at each switched state is measured and stored for later use. The detail of step 412 is shown in the flow chart of FIG. 5.

In step 420, the microcomputer 250 turns Q1 and Q2 OFF. After Q1 and Q2 are turned OFF, the microcomputer delays a predetermined amount of time in step 422. Referring to FIG. 3B, transistors Q1 and Q2 turning OFF occurs at time TA and the delay time is equal to the amount of time between $T_A$ and $T_B$. At time $T_B$, the microcomputer in step 424 reads the voltage values present at all the A/D input channels and stores these values in its memory. The capacitors 130, 132 are charging during the time period between $T_A$ and $T_B$. At time $T_B$, the microcomputer in step 426 turns ON transistor Q1. The microcomputer then delays a predetermined time in step 428. The time delay in step 428 is depicted in FIG. 3B as the time between $T_B$ and $T_C$. During this time period, the capacitors 130, 132 are discharging at a rate slower than when both transistors Q1 and Q2 are ON. At time $T_C$, the microcomputer, in step 430, reads the voltage values $V_C$ and $V_F$ and stores them in its memory. At time $T_C$, the microcomputer, in step 432, turns ON transistor Q2 and delays a predetermined amount of time in step 434. The predetermined amount of time in step 434 is depicted as the time between $T_C$ and $T_D$ in FIG. 3B. During the time period between $T_C$ and $T_D$ the transistors Q1 and Q2 are both ON and the capacitors 130, 132 discharge at the same rate as occurs between times $T_0$ and $T_A$. At time $T_D$, the microcomputer in step 436 reads the voltages values present at $V_C$, $V_F$, and $V_S$ and stores these values in its memory 405. At time $T_D$, the microcomputer in step 438 turns transistor Q1 OFF and delays for a predetermined amount of time in step 440. The time delay 440 is depicted as the time between $T_D$ and $T_{0'}$ in FIG. 3B. During this time period, the capacitors 130, 132 continue to discharge but at a slower rate than when Q1 and Q2 are both turned ON. At time $T_{0'}$, the microcomputer, in step 442, reads the voltage values present at $V_C$ and $V_F$ and stores these readings in its memory.

In step 444, the microcomputer determines whether the discharge flag has been set. If the discharge flag has been set, transistor Q1 is turned ON in step 446 and the program returns to the main program in step 448. It will be appreciated that step 446 insures that both transistors Q1 and Q2 are both ON so as to continue the discharge portion of the capacitor test. If the determination in step 444 is negative, which means that the capacitors are in their charging mode, the program proceeds to step 450 where transistor Q2 is turned OFF. Step 450 insures that both transistors Q1 and Q2 are OFF which would charge the capacitors 130, 132.

Referring back to FIGS. 4A, 4B, the microcomputer performs monitor tests in step 460. The monitor tests are gross measurements of the values of resistors 114, 118 so as to insure that no open circuit or short circuit exits. The first test conducted in the series of monitor tests by the microcomputer 250 is to recall the value of the voltage present at terminal 108 when transistor Q2 was ON and recall the value present at the terminal 108 when the transistor Q1 was turned ON. The microcomputer then performs an algorithm to determine if:

$$\frac{V_F(Q2 \text{ ON})}{V_F(Q1 \text{ ON})} < .11 \tag{2}$$

If this algorithm is true, it is assumed that the safing sensor 106 is open circuited. If such occurs, this is a monitor test failure. After all the monitor tests are completed, the program proceeds to step 462 where the microcomputer determines whether all the monitor tests have passed. If the algorithm (2) is true, program proceeds to step 464 where the indicator light is lit. The program then proceeds to step 466 where the failure is recorded in the EEPROM. The program then proceeds to step 468 where the microcomputer monitors the time occurrence of the failure and begins to time and record the duration that the failure exists in the EEPROM. The program then proceeds to step 470.

The other monitor tests conducted in step 460 include recalling of the charge value across the capacitor $V_C$ and the voltage value present at terminal 108 when Q1 and Q2 were OFF and also the front value present at terminal 108 when the transistor Q2 is turned ON. The microcomputer 250 then performs the following two algorithms to determine if:

$$V_C - V_F < 0.02 \tag{3}$$

$$V_C - V_F(Q2 \text{ ON}) < 0.02 \tag{4}$$

If both of the equations (3) and (4) are true, the microcomputer assumes that the safing sensor is shorted. Otherwise, the microcomputer then proceeds to recall the value present at terminal 108 when Q1 and Q2 were OFF, the value of the voltage present at terminal 134, and the value present at terminal 108 when the transistor Q2 was ON. The program then proceeds to perform the following two algorithms to determine if:

$$\frac{V_F}{V_C} > .5 \tag{5}$$

$$\frac{V_F(Q2 \text{ ON})}{V_F} > .35 \tag{6}$$

If both the equations (5) and (6) are true, the microcomputer assumes that the safing sensor 106 is short circuited. Otherwise, the microcomputer recalls the value at terminal 108 when Q1 and Q2 were OFF and the value of the terminal 108 when the transistor Q1 was ON and performs the following algorithms to determine if:

$$V_F < .02 \tag{7}$$

$$\frac{V_F(Q1 \text{ ON})}{V_F} < .02 \tag{8}$$

If both equations (7) and (8) are true, the microcomputer assumes that the front sensor 110 is short circuited. Otherwise, the microcomputer recalls the value at terminal when Q1 and Q2 were OFF, the value at terminal 134, and the value at terminal 108 when transistor Q1 was ON. The microcomputer then performs the following two algorithms to determine if:

$$\frac{V_F}{V_C} < .5 \tag{9}$$

$$\frac{V_F(Q1 \text{ ON})}{V_C} < .78 \tag{10}$$

If both equations (9) and (10) are true, the microcomputer assumes that the front sensor 110 is short circuited. Otherwise, the microcomputer recalls the value present at terminal 134, the value present at terminal 108 when Q1 and Q2 were OFF, the value present at terminal 108 when the transistor Q1 was ON and the value present at the terminal 108 when transistor Q2 was ON. The microcomputer then performs the algorithm to determine if:

$$\frac{V_C - V_F}{V_F(Q1 \text{ ON}) - V_F(Q2 \text{ ON})} < .4 \tag{11}$$

If equation (11) is true, the microcomputer assumes that the front sensor is open circuited.

If no failures have occurred in step 460, it is assumed that the resistors 114, 118 are electrically connected and that their resistance values are within a range that can be measured by the circuit 100. If all the tests pass, the program branches from step 462 to step 480 when the microcomputer calculates the resistance values of the resistors 114, 118. To calculate the resistances of resistor 114, 118 the following equation is used:

$$V_F = V_C \cdot \frac{R(118)}{R(118) + R(114)} \quad (12)$$

When transistor Q1 is OFF and Q2 is ON, the voltage then present at terminal 108 is defined as $V_F$, and can be expressed by the following equation:

$$V_F = V_C \cdot \frac{R}{R(114) + R} \quad (13)$$

Where the resistance R is equal to the following:

$$R = \frac{R(118) \cdot R(294)}{R(118) + R(294)} \quad (14)$$

Therefore, the resistance value of resistor 118 is solved by the following equation:

$$R(118) = \frac{V_C \cdot (V_F - V_F)}{V_F \cdot (V_C - V_F)} R(294) \quad (15)$$

If the value of resistor 294 is selected to be 1 kohms, then equation (15) reduces to:

$$R(118) = \frac{V_C \cdot (V_F - V_F)}{V_F \cdot (V_C - V_F)} \quad (16)$$

Where the resistance of resistor 118 is expressed in kohms. By substituting equation (16) into equation (12), the resistance value of resistor 114 is calculated according to the equation:

$$R(114) = \frac{V_C \cdot (V_F - V_F)}{V_F \cdot V_F} \quad (17)$$

Equation (17) assumes that the value of resistor 294 is 1 kohms and therefore the resistance value of resistor 114 expressed by equation (17) is in kohms.

It will be appreciated that the resistance values for resistors 114, 118 were derived by measurements taken by only two cycles of the transistors Q1 and Q2, i.e., the measurement when Q1 and Q2 were OFF and the measurements when Q1 was OFF and Q2 was ON. It will be appreciated that the same calculations could have been made with the measurements when Q1 and Q2 were OFF and the measurements when Q1 was ON and Q2 was OFF. If $V_{F'}$ is the measurement present at terminal 108 when transistor Q1 is ON and Q2 is OFF, the resistance values are solved according to the following equations:

$$R(114) = \frac{V_C \cdot (V_{F'} - V_F)}{V_F \cdot (V_C - V_{F'})} \quad (18)$$

$$R(118) = \frac{V_C \cdot (V_{F'} - V_F)}{(V_C - V_{F'}) \cdot (V_C - V_F)} \quad (19)$$

The voltage values $V_C$, $V_F$, $V_F$ and $V_F'$ are measured through the A/D converter 140. The A/D converter is an eight bit converter that serially outputs a binary number having a value between 0 and 256. A binary number of 0 is output when 0 volts is measured.

A binary number of 256 is output when the measured voltage is equal to a reference voltage of the A/D converter. As the voltage values $V_F$, $V_{F'}$, $V_F$, get close to 0 or as the quantity $(V_F - V_F)$ or $(V_F - V_{F'})$ get close to 0, an uncertainty results due to the operating characteristics of the A/D converter. The A/D converter typically has a measurement uncertainty of ±1. If, as a result of the measured voltage, the A/D converter would output a binary number of 100, the ±1 uncertainty represents a ±1% error. However, as the voltage nears 0 and, for example, the A/D converter outputs a binary number of 5, the ±1 uncertainty is equal to a ±20% uncertainty in the measurement. Therefore, extremely small voltage values make measurement impractical using the A/D converter. It is for this reason that the present invention performs the monitored tests in step 460 to initially determine whether the voltage values are within a range that would yield a meaningful measurement with the A/D converter.

The program branches from step 480 to step 482 where a determination is made as to whether or not all the calculated resistance values done in step 480 are within predetermined limits. If a determination in step 482 is negative, the program proceeds to step 464 where the indicator is actuated. A determined error in a resistance value would be recorded in the EEPROM in step 466 and the time of failure would be monitored and recorded in step 468. From step 468 or from an affirmative determination in step 482, a determination is made in step 470 as to whether the discharge flag is set. If the discharge flag is set, the program proceeds to step 486 where a determination is made as to whether the discharge time has lapse.

The determination as to how long the capacitor is to be discharged before a final measurement of the voltage $V_C$ is taken for capacitance test purposes is determined by the expectant discharge curve of the capacitors. The voltage $V_C$, ignoring the voltage drops across diodes 124, 128, when Q1 and Q2 are OFF can be expressed as:

$$V_C = \frac{26.3 \cdot (R(114) + R(118))}{(R(114) + R(118)) R(126)} \quad (20)$$

Assuming the resistance values for resistors 114, 118 are both 5 kohms resistors, and the resistor 126 is a 510 ohm resistor, then $V_C$ is equal to 25 volts DC. When transistors Q1 and Q2 are both ON, the voltage across the capacitors will attempt to discharge to a voltage value $V_C$, again ignoring the voltage drops across diodes 124, 128, which can be expressed as:

$$V_C = \frac{26.3 \cdot (R(114) \| R(264) + R(118) \| R(294))}{(R(114) \| R(264) + R(118) \| R(294)) + R(126)} \quad (21)$$

The symbol $\|$ is used to indicate "in parallel with."

Assuming that $R_{264}$ and $R_{294}$ are both 1 kohm resistors, this yields a value of $V_C = 20.19$. The time constant $\tau$ for discharges equal to:

$$\tau = (C(130) + C(132)) ((R(114) \| R(264)) + \quad (22)$$
$$R(118) \| R(294)) \| R(126)$$

It is desirable to pick a point along the discharge curve where the slope of the discharge voltage vs time is still significant, i.e., before the curve flattens out. This reduces possible measurement errors. In the example discussed above, the time period should be well before the voltage is expected to drop to 20.1 volts. It has been found where the capacitors 130, 132 are each equal to 1,000 microfarads, a discharge time of 300 milliseconds and a charge time of approximately 7 seconds were needed for testing purposes. It is preferable that the capacitors not be discharged below a level necessary to fire the squib, i.e., even a fully discharged level of the capacitors by the switching circuit should be sufficient to fire the squib.

Referring to FIG. 3B, a time period between $T_0$ and time $T_A$ is approximately equal to 24.9 milliseconds with switching of the transistors Q1 and Q2 occurring every 1.7 milliseconds. The time period between each $T_0$ and $T_{0'}$, etc. is approximately 30 milliseconds. If the total discharge time is 300 milliseconds, it will be appreciated that ten complete tests of the resistance values can occur during the discharge period.

Figure 4A:
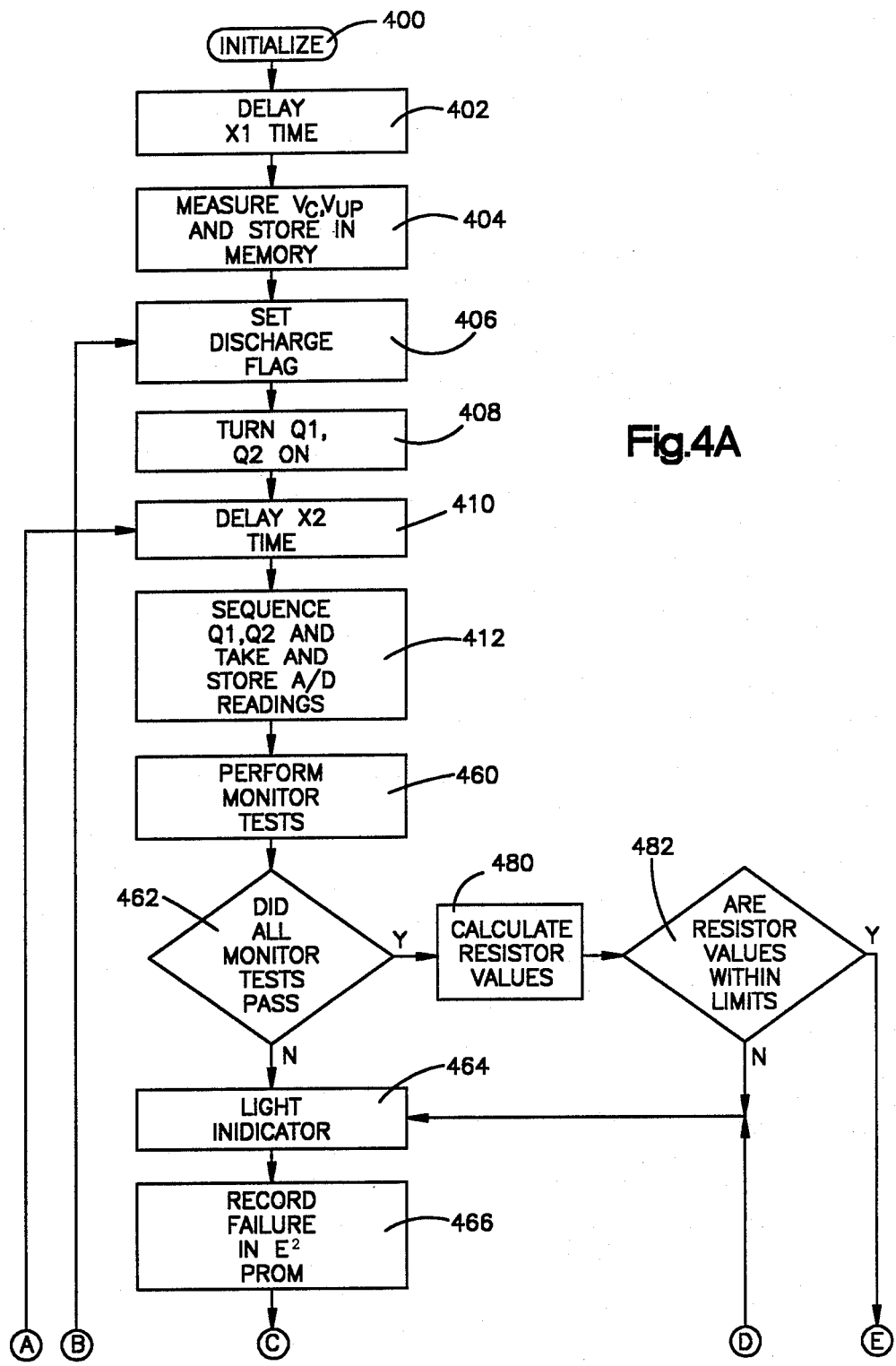
FIGS. 4A and 4B show a single flow chart illustrating operational logic steps followed by the apparatus of FIG. 2.
Figure 4B:
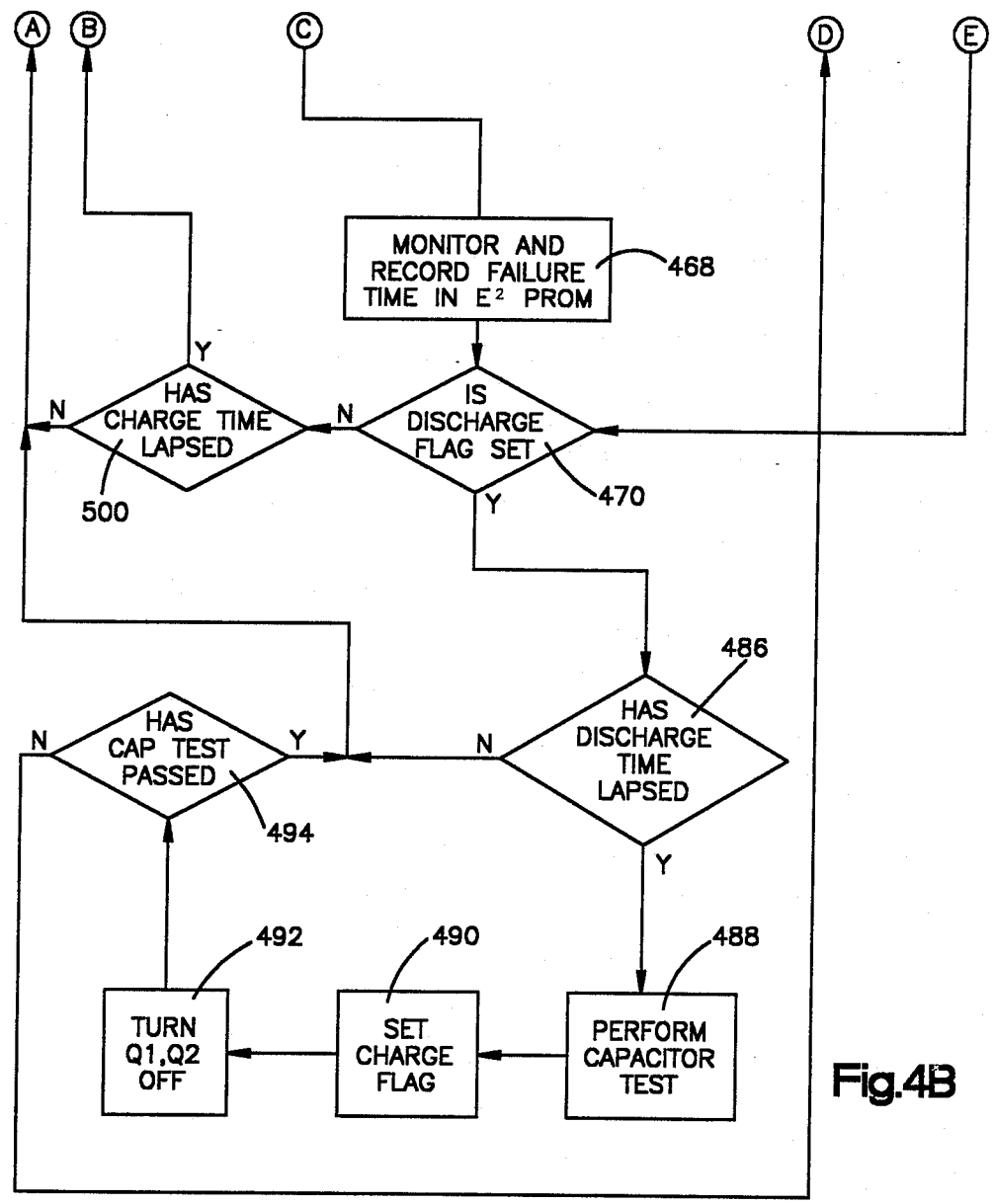
Figure 5:
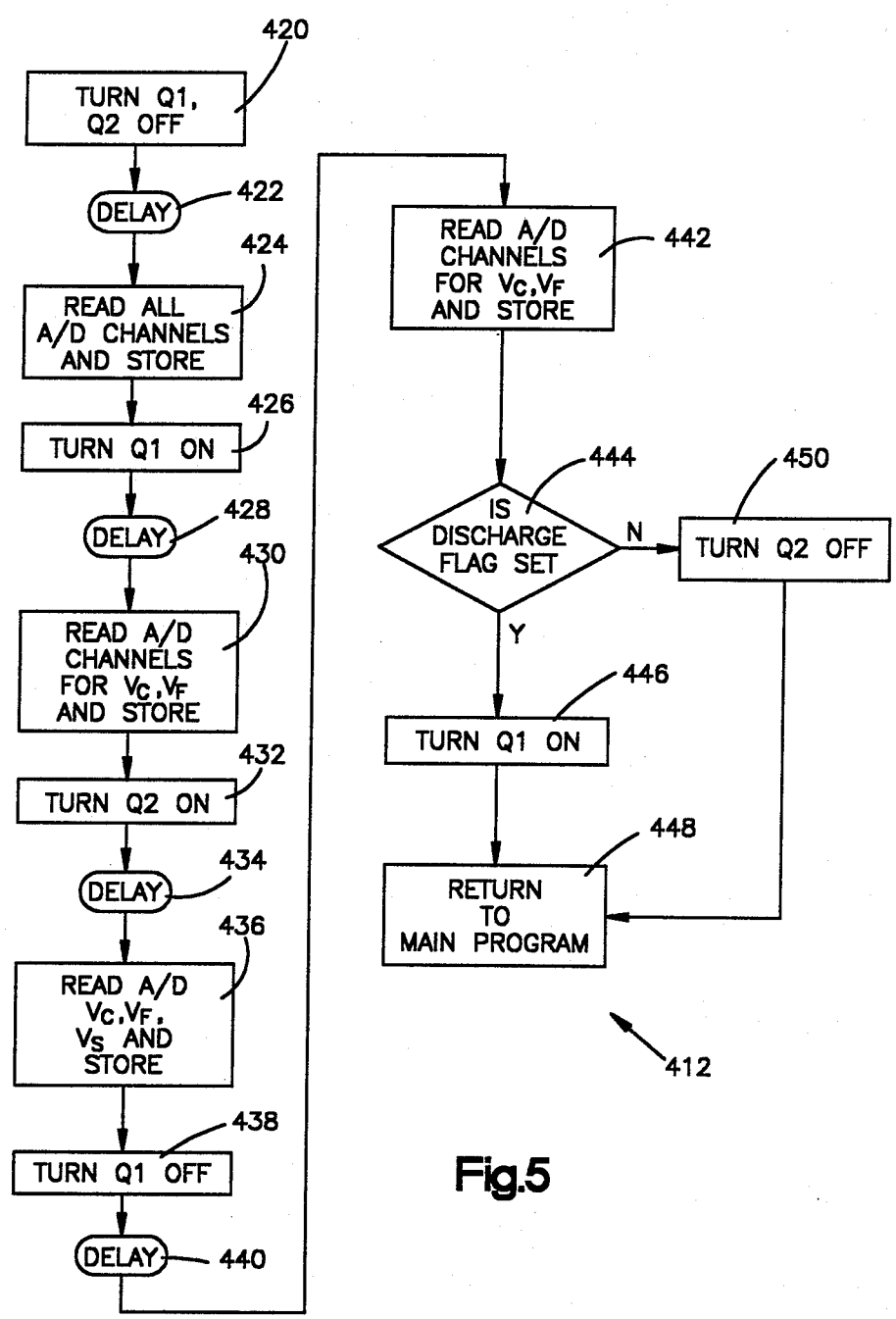
FIG. 5 is a flow chart illustrating in greater detail the operational logic performed in one step of FIG. 4.

Referring to FIGS. 4A and 4B, if the discharge time has not lapsed, e.g., 300 milliseconds, the program returns to step 410 where the microcomputer delays, e.g., 24.9 milliseconds, before beginning to again sequence the transistors Q1 and Q2. If the discharge time has elapsed, the program proceeds from step 486 to step 488 where the capacitance test is performed. The capacitance test is to measure the voltage $V_C$ and to determine if the adjusted $\Delta V$ has been exceeded, i.e., determine if the voltage $V_C$ measured in step 404 minus $V_C$ measured during last sequence is greater than $\Delta V$ adjusted.

In step 490, a charge flag is set and the transistors Q1 and Q2 are turned OFF in step 492. When this occurs, the capacitors 130, 132 begin to charge. A determination is made in step 494 as to whether the capacitor test has passed. If the determination in step 494 is negative, the program proceeds to step 464 where the indicator light is actuated, the failure is recorded in the EEPROM in step 466 and the time of failure is recorded in step 468. If the capacitor test has passed, the program proceeds from step 494 to step 410 where the microcomputer delays.

FIG. 3C depicts the charging cycle where at time $T_1$ the transistors Q1 and Q2 are both OFF for a majority time period of each test cycle and the capacitors are charging. At time $T_E$, the transistor sequence begins in step 412. The complete sequence occurs at the time periods $T_E$, $T_F$, $T_G$, $T_H$, and $T_I$. The remainder of the program proceeds in a similar manner as described with regard to the discharge cycle. The monitor tests are performed in step 460. If all the monitor tests pass, the resistor values are calculated in step 480. When the inquiry is made in step 470 as to whether the discharge flag is set, a negative determination occurs during the charging cycle in which the program branches to step 500 where a determination is made as to whether or not the charge time has elapsed.

In the example given, charge time takes approximately 7 seconds. If the charge time has not elapsed, the program proceeds to step 410 and the cycle is again repeated. If the charge time has elapsed, the program proceeds to step 406 where the discharge flag is set and the cycle repeats. If resistance calculations are made every 30 milliseconds, approximately 230 complete resistance test cycles are completed during the charging period of the capacitors.

It will thus be appreciated that the capacitance test and resistance tests occur in parallel, i.e., simultaneously.

Although the invention has been described reference to a preferred embodiment, those skilled in the art will appreciate alterations, modifications and improvements to such preferred embodiment. Such alterations, modifications, and improvements are intended to be covered by the scope of the appended claims.

Having described a preferred embodiment of the invention, we claim:

1. An apparatus for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a first voltage value so that if the capacitor's capacitance is greater than a predetermined value, a sufficient electrical potential would be available to fire the squib from the capacitor's stored electrical energy when the first and second inertia switches close, said apparatus comprising:

means for partially discharging said capacitor for a predetermined time period;

means for monitoring the voltage value of the charge remaining across said capacitor after said predetermined period, the monitored voltage value being a second voltage value;

means for comparing the difference between the first voltage value and the second voltage value against a predetermined limit; and means for providing a failure indication to the vehicle operator if the comparing means determines that the voltage value difference is greater than said predetermined limit 2. The apparatus of claim 1 wherein said means for partially discharging said capacitor includes a solid state switching device connected in series with a resistor, the series combination of the switching device and the resistor connected in parallel with said capacitor and a timing circuit controllably connected to the solid state switching device.

3. The apparatus of claim 2 wherein said means for monitoring the voltage value includes a voltage dividing network connected in parallel with said capacitor and an analog-to-digital converter connected to the voltage dividing network.

4. The apparatus of claim 1 wherein said means for comparing includes a microcomputer connected to said analog-to-digital converter, said microcomputer storing the predetermined limit within its internal memory.

5. The apparatus of claim 4 wherein said microcomputer includes means for adjusting the predetermined limit based on the voltage value of the source of electrical energy that charges said storage capacitor.

6. The apparatus of claim 5 wherein said adjustment is done by said microcomputer performing an algorithm according to:

$$\Delta V(adj) = \Delta V + K \cdot ((Vmeas) - (Vexp))$$

where $\Delta V$ = a predetermined limit,

K = constant related to the gain of the term (Vmeas) − (Vup),

Vexp = the expected value of the source of electrical energy that charges said capacitor, and Vmeas = the actual value of the source of electrical energy that charges said capacitor.

7. An apparatus for testing an airbag restraint system of the type including a squib, a first inertia switch connected to one terminal of the squib and to a source of electrical energy, a second inertia switch connected to the other terminal of the squib and to electrical ground, each of the inertia switches including an associated resistor connected in parallel across its associated switch, said apparatus comprising:

a first switching network connected in parallel with the first inertia switch, said first switching network including a first actuatable solid state switch connected in series with a first test resistor having a known resistance value for, when actuated, connecting said first test resistor in parallel with the associated resistor of the first inertia switch;

a second switching network connected in parallel with the second inertia switch, said second switching network including a second actuatable solid state switch connected in series with a second test resistor having a known resistance value for, when actuated, connecting the second test resistor in parallel with the associated resistor of the second inertia switch;

means for controlling said first and second solid state switches so as to (i) in a first condition have both solid state switches OFF, and (ii) in a second condition have one solid state switch ON and one OFF;

means for monitoring the voltage value of the source of electrical energy and for monitoring the voltage values at a junction between the squib and one of the inertia switches when one of said solid state switching devices are in the first and second conditions; and means for calculating the resistance values of the inertia switch resistors from the monitored voltage values.

8. The apparatus of claim 7 wherein said means for calculating include means for solving an algorithm according to:

$$R(IS1) = [[V(s)*(V(j)-V(j)')]/[V(j)'*(V(s)-V(j))]]*R(SSS)$$

and $$R(IS2) = [[V(s)*(V(j)-V(j)')]/[V(j)']]*R(SSS)$$

where
- R(IS1) = resistance, of first inertia switch resistor
- R(IS2) = resistance of second inertia switch resistor
- V(s) = voltage value of supply voltage
- V(j) = voltage value at inertia switch junction with both solid state switches OFF
- V(j)' = voltage value of inertia switch junction one solid state switch ON and the other OFF, and
- R(SSS) = value of resistor in series with actuated solid state switch.

9. An apparatus for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a first voltage value so that if the capacitor's capacitance value is greater than a predetermined value, a sufficient electrical potential would be available to fire the squib from the capacitor's stored electrical energy when the first and second inertia switches close, each of the inertia switches including an associated resistor connected in parallel across its associated switch, said apparatus comprising:

a first switching network connected in parallel with the first inertia switch, said first switching network including a first actuatable solid state switch connected in series with a first test resistor having a known resistance value for, when actuated, connecting said first test resistor in parallel with the associated resistor of the first inertia switch;

a second switching network connected in parallel with the second inertia switch, said second switching network including a second actuatable solid state switch connected in series with a second test resistor having a known resistance value for, when actuated, connecting the second test resistor in parallel with the associated resistor of the second inertia switch;

means for switching said first and second solid state switches into various conditions so that (i) in a first condition, both solid state switches are OFF, (ii) in a second condition, said first solid state switch is ON and said second solid state switching device is OFF, (iii) in a third condition, said first solid state switch is ON and said second solid state switch is ON, and (iv) in a fourth condition, said first solid state switch is OFF and said second solid state switch is ON;

means for monitoring the voltage value of the source of electrical energy and for monitoring the voltage values at a junction between the squib and one of the inertia switches when said solid state switching devices are in each of said various conditions;

means for calculating the resistance values of the inertia switch resistors from the measured voltage values;

first comparing means for comparing the calculated resistance values against predetermined limits;

means for partially discharging said capacitor during said first predetermined time period;

means for monitoring the voltage value of the charge remaining across said capacitor after said first predetermined time period, the monitored voltage value of the remaining capacitor charge being a second voltage value;

second comparing means for comparing the difference between the first voltage value and the second voltage value against a predetermined limit; and means for providing a failure indication to the vehicle operator if the first comparing means determines a calculated resistance value is outside of the predetermined limits or the second comparing means determines that said voltage value difference is greater than the predetermined limit.

10. A method for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of electrical energy so as to charge the capacitor to a first voltage value so that if the capacitor's capacitance is greater than a predetermined value, a sufficient electrical potential would be available to fire the squib from the capacitor's stored electrical energy when the first and second inertia switches close, said method comprising the steps of:

(a) partially discharging said capacitor for a predetermined time period;

(b) monitoring the voltage value of the charge remaining across said capacitor after said predetermined time period, the monitored voltage value being a second voltage value;

(c) comparing the difference between the first voltage value and the second voltage value against a predetermined limit; and (d) providing a failure indication to the vehicle operator if the comparing means determines that said voltage value greater than said predetermined limit.

11. The method of claim 10 further including the step of adjusting the predetermined limit based on the voltage value of the source of electrical energy that charges said storage capacitor.

12. The method of claim 11 wherein said step of adjusting includes performing an algorithm according to:

$$\Delta V(Adj) = \Delta V + K((Vmeas) - (Vexp))$$

where $\Delta V$ = a predetermined limit,
K = constant related to the gain of the term (Vmeas) − (Vexp)
Vexp = the expected value of the source of electrical energy that charges said capacitor, and
Vmeas = the actual value of the source of electrical energy that charges said capacitor.

13. A method for testing an airbag restraint system of the type including a squib, a first inertia switch connected to one terminal of the squib and to a source of electrical energy, a second inertia switch connected to the other terminal of the squib and to electrical ground, each of the inertia switches including an associated resistor connected in parallel across its associated switch, said method comprising the steps of:

(a) actuating a first switching network connected in parallel with the first inertia switch, said first switching network including a first actuatable solid state switch connected in series with a first test resistor having a known resistance value for, when actuated, connecting said first test resistor in parallel with the associated resistor for the first inertia switch;

(b) actuating a second switching network connected in parallel with the second inertia switch, said second switching network including a second actuatable solid state switch connected in series with a second test resistor having a known resistance value for, when actuated, connecting the second test resistor in parallel with the associated resistor for the second inertia switch;

(c) controlling said first and second solid state switches so as to (i) in a first condition have both solid state switches not actuated, and (ii) in a second condition have one solid state switch actuated and one not actuated;

(d) monitoring the voltage value of the source of electrical energy and for monitoring the voltage values at a junction between the squib and one of the inertia switches when one of said solid state switching devices are in the first and second conditions; and (e) calculating the resistance values of the inertia switch resistors from the measured voltage values.

14. The method of claim 13 wherein said step of calculating includes solving an algorithm according to:

$$R(IS1) = [[V(s)*(V(j) - V(j)')]/[V(j)'*(V(s) - V(j))]]*R(SSS)$$

and $$R(IS2) = [[V(s)*(V(j) - V(j)')]/[V(j)*(j)]]*R(SSS)$$

where
R(IS1) = resistance of first inertia switch resistor
R(IS2) = resistance of second inertia switch resistor
V(s) = voltage value of supply voltage.
V(j) = voltage value at inertia switch junction with both solid state switches OFF
V(j)' = voltage value of inertia switch junction one solid state switch ON and the other OFF, and
R(SSS) = value of resistor in series with actuated solid state switch.

15. A method for testing the operativeness of a storage capacitor in an airbag restraint system of the type including a squib, a first inertia switch connected to one terminal of the squib and to the storage capacitor, a second inertia switch connected to the other terminal of the squib and to electrical ground, means for connecting the capacitor to a source of eletrical energy so as to charge the capacitor to a first voltage value so that if the capacitor's capacitance value is greater than a predetermined value, a sufficient electrical potential would be available to fire the squib from the capacitor's stored electrical energy when the first and second inertia switches close, each of the inertia switches including an associated resistor connected in parallel across its associated switch, said method comprising the steps of:

(a) actuating a first switching network connected in parallel with the first inertia switch, said first switching network including a first actuatable solid state switch connected in series with a first test resistor having a known resistance value for, when actuated, connecting said first test resistor in parallel with the associated resistor for the first inertia switch;

(b) actuating a second switching network connected in parallel with the second inertia switch, said second switching network including a second actuatable solid state switch connected in series with a second test resistor having a known resistance value for, when actuated, connecting the second test resistor in parallel with the associated resistor for the second inertia switch;

(c) controlling said first and second solid state switches so after a first predetermined time period so as to have said switches (i) in a first condition in which both solid state switches are unactuated, (ii) in a second condition in which said first solid state switch is actuated and said second solid state switch is not actuated, (iii) in a third condition in which said first solid state switch is actuated and said second solid state switch is actuated, and (iv) in a fourth condition in which said first solid state switch is not actuated and said second solid state switch is actuated;

(d) monitoring the voltage value of the source of electrical energy and for monitoring the voltage values at a junction between the squib and one of the inertia switches when said solid state switching devices are in each of said conditions;

(e) calculating the resistance values of the inertia switch resistors from the measured voltage values;

(f) comparing the calculated resistance values against predetermined limits;

(g) partially discharging said capacitor during said first predetermined time period;

(h) monitoring the voltage value of the charge remaining across said capacitor after said first predetermined time period, the monitored voltage value remaining being a second voltage value;

(i) comparing the difference between the first voltage value and the second voltage value against a predetermined limit; and (j) providing a failure indication to the vehicle operator if the comparing steps determines (i) that the calculated resistance values are outside of the predetermined limits or (ii) that said voltage value difference is greater than said predetermined limit.

* * * * *

UNITED STATES PATENT AND TRADEMARK OFFICE
CERTIFICATE OF CORRECTION

PATENT NO. : 4,835,513
DATED : May 30, 1989
INVENTOR(S) : Roger A. McCurdy and Dana A. Stonerook It is certified that error appears in the above-identified patent and that said Letters Patent is hereby corrected as shown below:

Column 17, Line 44, change "/[V(j)']]*R(SSS)" to
--/[V(j)*V(j)']]*R(SSS)--

Column 20, Line 4, change "/[V(j)*(j)]]*R(SSS) to
--/[V(j)*V(j)']]*R(SSS)--

Signed and Sealed this

Twenty-fourth Day of April, 1990

Attest:

HARRY F. MANBECK, JR.

*Attesting Officer*  *Commissioner of Patents and Trademarks*